(12) United States Patent
Knudson et al.

(10) Patent No.: US 11,216,473 B2
(45) Date of Patent: Jan. 4, 2022

(54) QUALITATIVE MODIFIER IN QUERY INPUT

(71) Applicant: Lenovo (Singapore) Pte. Ltd., Singapore (SG)

(72) Inventors: Ryan Charles Knudson, Durham, NC (US); Russell Speight VanBlon, Raleigh, NC (US); Roderick Echols, Chapel Hill, NC (US); Jonathan Gaither Knox, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 105 days.

(21) Appl. No.: 16/587,374

(22) Filed: Sep. 30, 2019

(65) Prior Publication Data
US 2021/0097086 A1 Apr. 1, 2021

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 6,353,823 | B1* | 3/2002 | Kumar | G06F 16/10 |
| 10,169,488 | B2* | 1/2019 | Long | G06F 16/90324 |
| 10,282,444 | B2* | 5/2019 | Bozkaya | G06F 16/248 |
| 2010/0306249 | A1* | 12/2010 | Hill | G06Q 50/01 707/769 |
| 2014/0180677 | A1* | 6/2014 | McCaffrey | G06F 40/289 704/9 |
| 2016/0246805 | A1* | 8/2016 | Long | G06F 16/951 |
| 2017/0075891 | A1* | 3/2017 | Bozkaya | G06F 16/24522 |
| 2019/0138557 | A1* | 5/2019 | Long | G06F 16/90324 |

* cited by examiner

*Primary Examiner* — Kim T Nguyen
(74) *Attorney, Agent, or Firm* — Ference & Associates LLC

(57) ABSTRACT

One embodiment provides a method, including: receiving, at an information handling device, query input from a user; determining, using a processor, whether a qualitative modifier exists in the query input that modifies a subject of the query input; identifying, responsive to determining that a qualitative modifier exists in the query input and by accessing a user profile, at least one user preference associated with the subject of the query input and at least one governing criteria for the identified qualitative modifier; and providing, based on the identifying, query results. Other aspects are described and claimed.

20 Claims, 3 Drawing Sheets

QUALITATIVE MODIFIER IN QUERY INPUT

BACKGROUND

Individuals often have questions about various things that they seek the answers to. For example, individuals may require directions to a location, may want recommendations for restaurants or movies, may want opinions about a topic, etc. Generally, the quickest and easiest way to obtain these answers is by interacting with an information handling device ("device"), for example, smart phone, tablet, digital assistant, laptop and/or personal computer, and the like. More particularly, an individual may provide their question to their device (e.g., to a digital assistant embodied on the device, to a search engine, etc.) that may thereafter return one or more responsive results.

BRIEF SUMMARY

In summary, one aspect provides a method, comprising: receiving, at an information handling device, query input from a user; determining, using a processor, whether a qualitative modifier exists in the query input that modifies a subject of the query input; identifying, responsive to determining that a qualitative modifier exists in the query input and by accessing a user profile, at least one user preference associated with the subject of the query input and at least one governing criteria for the identified qualitative modifier; and providing, based on the identifying, query results.

Another aspect provides an information handling device, comprising: a processor; a memory device that stores instructions executable by the processor to: receive query input from a user; determine whether a qualitative modifier exists in the query input that modifies a subject of the query input; identify, responsive to determining that a qualitative modifier exists in the query input and by accessing a user profile, at least one preference associated with the subject of the query input and at least one governing criteria for the identified qualitative modifier; and provide, based on the identifying, query results.

A further aspect provides a product, comprising: a storage device that stores code, the code being executable by a processor and comprising: code that receives query input from a user; code that determines whether a qualitative modifier exists in the query input that modifies a subject of the query input; code that identifies, responsive to determining that a qualitative modifier exists in the query input and by accessing a user profile, at least one user preference associated with the subject of the query input and at least one governing criteria for the identified qualitative modifier; and code that provides, based on the identifying, query results.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
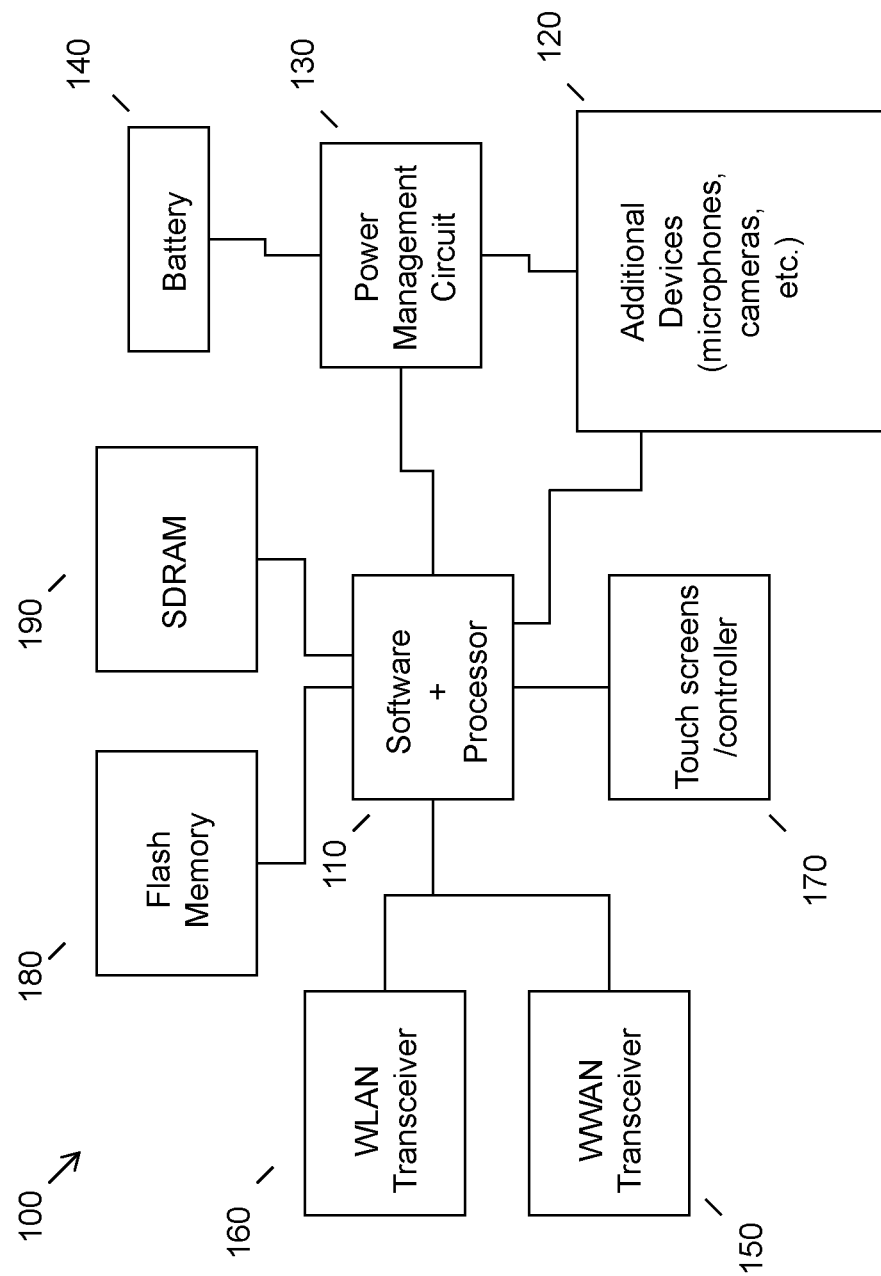
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional searches that are conducted via a digital assistant or a search engine generally only return best match results and ignore the qualitative aspects of the user query. For example, User A may provide the following query to a digital assistant: "What are some good Thai restaurants near me?" Conventionally, a digital assistant may subsequently output a list of all known Thai restaurants within an area proximate to the user. However, these results are returned without consideration of the qualitative modifier, "good", present in the user's query. If such a modifier was considered in the search, then different results may have been returned to a user, e.g., the ordering of the search results may have changed (e.g., higher ranked Thai restaurants may have been presented before lower ranked Thai restaurants, etc.), certain restaurants may have been omitted from the results (e.g., those restaurants having a ranking that does not correspond to "good", etc.), etc.

Accordingly, an embodiment provides a method of returning search results based at least upon one or more qualitative modifiers present in the user query. In an embodiment, query input may be received from a user. An embodiment may then determine whether one or more qualitative modifiers are present in the query input. The qualitative modifier may modify a subject of the query input (e.g., the qualitative modifier may be an adjective that describes the subject of the query input, etc.). Thereafter, an embodiment may access a user profile and may identify a user preference associated with the subject of the query as well as at least one governing criteria for the qualitative modifier. For example, using the aforementioned restaurant example, an embodiment may identify a user preference specifying that the user does not want to see any restaurants in the search results that are ranked below 4.5 and may identify that the governing criteria (i.e., the source that defines what is "good") corresponds to a specific restaurant review website. Using the foregoing data points, an embodiment may provide the user with search results corresponding to their user query. Such a method may return results that consider the qualitative modifiers present in the user's query and that are therefore more relevant to a user's needs.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
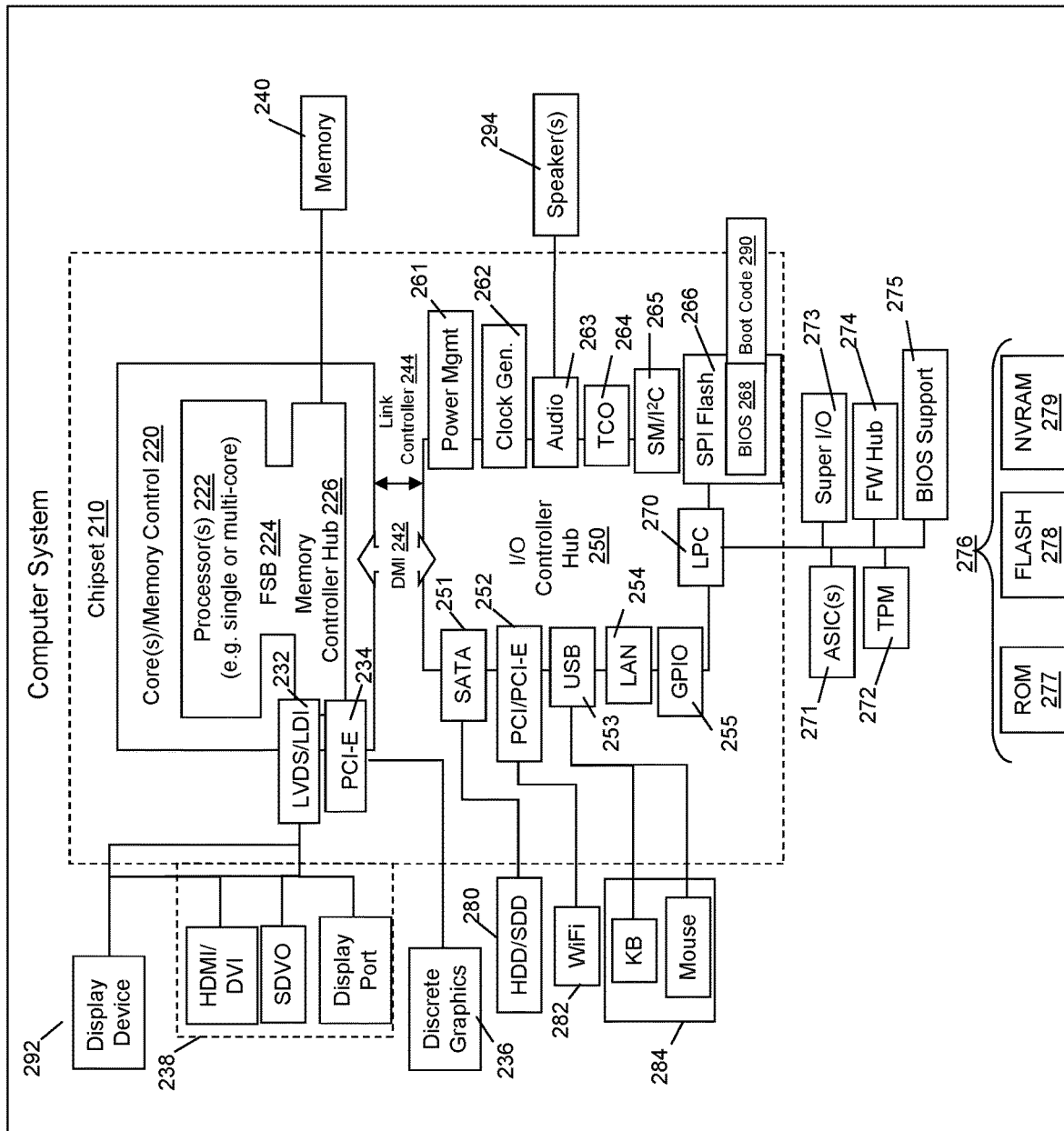
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving a user query and thereafter outputting search results corresponding to the user query. For example, the circuitry outlined in FIG. 1 may be implemented in a smart phone or tablet embodiment, whereas the circuitry outlined in FIG. 2 may be implemented in a laptop.

Figure 3:
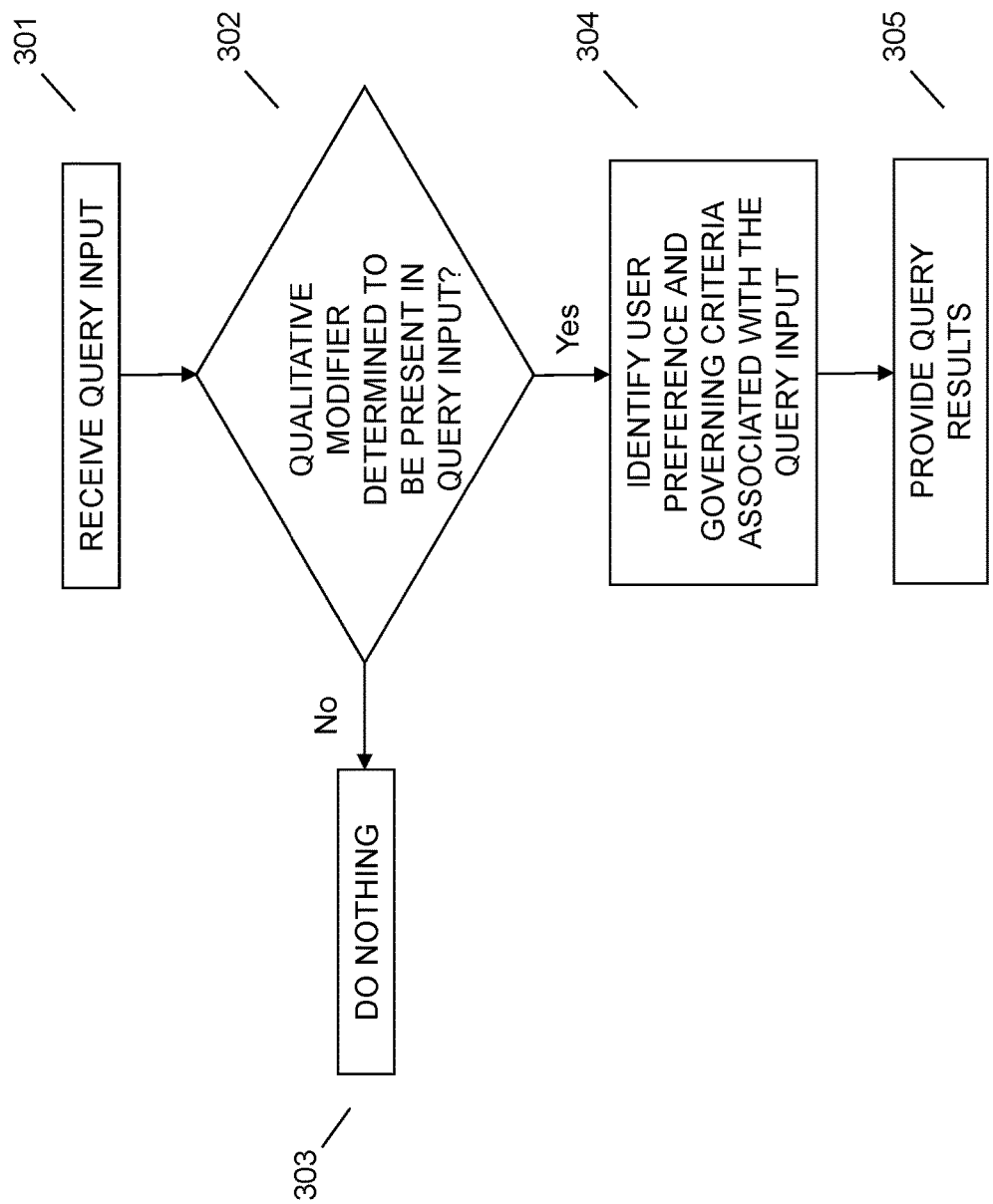
FIG. 3 illustrates an example method of returning query results based upon one or more qualitative modifiers in the user query.

Referring now to FIG. 3, an embodiment may provide search results that consider qualitative modifiers in a user's query. At 301, an embodiment may receive query input from a user. The query input may be provided by the user using virtually any known method of providing input to a device (e.g., keyboard input, voice input, gesture input, touch input, stylus input, a combination thereof, etc.). Correspondingly, the query input may be received using one or more other devices and/or sensors integrally or operatively coupled to the user's device (e.g., a capacitive display screen to receive touch or stylus input, a microphone to capture voice input, a camera to capture gesture input, etc.). In an embodiment, the query input may comprise a query that requests provision of one or more results. For example, the query input may be a recommendation request, an identification request, etc.

At 302, an embodiment may determine whether a qualitative modifier exists in the query input. In the context of this application, a qualitative modifier may correspond to one or more words that impact the meaning of a subject of the query input. For example, the qualitative modifier may be an adjective, e.g., "What are some good Thai restaurants in the area?", "What are the worst hotels in the area?", etc. In this situation, the presence of a qualitative modifier may be determined by first accessing a database (e.g., stored locally on the device, stored remotely on another device or server, etc.) comprising a list of qualitative modifier words. Thereafter, an embodiment may determine whether the query input comprises a qualitative modifier by comparing the words in the query input to the qualitative modifier words in the list. Responsive to identifying a match, an embodiment may conclude that the query input comprises at least one qualitative modifier.

In another embodiment, the qualitative modifier may be a deictic word that obtains its meaning from surrounding context data. For example, a user may be looking at an image of pizza on their smart phone and provide the query "Where can I find food like that?" An embodiment may impart meaning to the deictic term "that" by first identifying that the pizza is the subject of the user's query (e.g., using one or more sensors, eye-tracking technologies, etc.) and thereafter analyze aspects of the pizza (e.g., using one or more image analysis techniques, etc.) to further refine the user's query (e.g., by searching for pizza sharing similar aspects to the foregoing such as similar crust thickness, similar cheese prominence, similar topping choices, etc.). Similarly, in another example, an embodiment may contain an always-on microphone and/or an always-on camera that continuously captures all voice input and/or image input in the vicinity of the user. Suppose a user's friend was holding the pizza when the user uttered the foregoing query, an embodiment may utilize the camera sensor to identify aspects of the pizza.

Responsive to determining, at 302, that the query input does not comprise a qualitative modifier, an embodiment may, at 303, take no additional action. Alternatively, an embodiment may simply conduct a conventional search based on the words in the query input. Conversely, responsive to determining, at 302, that the query input comprises at least one qualitative modifier, an embodiment may, at 304, identify a user preference associated with the subject of the query as well as a governing criteria for qualitative modifier.

An embodiment may identify a listing of user preferences associated with various subjects by accessing a user profile. In an embodiment, the user profile may be a profile that is associated with a particular device, a profile that is associated with a particular user on the device, etc. Additionally, the user profile may be stored locally, on the device, or remotely on another device or server. In an embodiment, the user preferences may be explicitly identified by a user. Alternatively, in another embodiment, the user preferences may be dynamically identified by the system based upon an analysis of user behavior (e.g., past purchase data, activity on social media, etc.). Examples of the foregoing concepts include: a user preference to only identify establishments exceeding a predetermined threshold grade (e.g., only restaurants with an A rating, only 4-star and above hotels, etc.), a user preference to avoid establishments located in a particular area, a user preference to avoid activities predicted to exceed a predetermined, threshold cost, etc.

In the context of this application, a governing criteria related to the qualitative modifier may correspond to a defining source for the qualitative modifier. Stated differently, if the qualitative modifier is an adjective that may identify whether the subject of the query is "good" or "bad", the governing criteria may define what "good" and "bad" actually mean. For instance, the governing criteria may be associated with one or more of an individual, a group of individuals, an entity, etc., and the definitions for the qualitative modifiers may be based on the individual or collective views of these sources. As an example, User A may determine that they share a similar taste in movies with Individual B, a movie critic. If the reviews of Individual B are established as a governing criteria for movie-related queries, then when User A provides the query "What are the good movies playing in the theater right now" an embodiment may identify all the current movies playing in the theater that were ranked by Individual B above a predetermined threshold (e.g., 80%, etc.). As another example, User A may place trust in a particular friend group for their restaurant recommendations. Accordingly, responsive to receiving the query "What are some good Thai restaurants in the area?" an embodiment may access one or more available data sources (e.g., social media posts, email and/or text communications, etc.) that identify the food-based views of the friend group that are correspondingly used as the governing criteria for the qualitative modifier "good".

Using the combination of the identified user preferences and governing criteria in 304, an embodiment may thereafter conduct a search and subsequently provide, at 305, relevant query results. The provision of the relevant query results may be facilitated in a variety of different ways. For example, an embodiment may first filter out all the query results that are incompatible with either the user preference or the modified subject (i.e., modified by the definition provided by the governing criteria). An embodiment may then present the remaining compatible query results to the user in no particular order (e.g., on a display screen of a device, audibly through a speaker, etc.). Alternatively, an embodiment may present the compatible query results in a predetermined list or order. For example, an embodiment may identify the highest regarded result (e.g., as determined by the governing criteria, etc.) and present the compatible query results in a ranked order from highest regarded to lowest regarded. Alternatively, an embodiment may assign a compatibility score to each result in the list based upon an analysis of the user preferences and the governing criteria and thereafter present the most compatible result first, which is followed by the second result and so on. For example, Restaurant A may be very close to a user's home but may have the third highest review of the other potential restaurants in the query results. Restaurant B may be the best reviewed but may be the furthest away from the user's home. Assuming that the difference in the reviews between Restaurant A and Restaurant B is not dramatic, an embodiment may assign Restaurant A a higher compatibility score than Restaurant B despite the fact that Restaurant B has better reviews than Restaurant A.

As a non-limiting example implementation of the aforementioned process, a user may provide the query input "What are some good Thai restaurants in the area?" to a device. An embodiment may identify a user preference specifying that a user wants to see restaurants within 10 miles of their location and that they only want to see restaurants that have an "A" health rating. Additionally, an embodiment may identify that a user has selected a popular restaurant reviewing website as the governing criteria for food-based queries. Accordingly, an embodiment may return 4 results for restaurants that match the relevant criteria and the results may be presented to the user in a decreasing order of review scores (e.g., the higher reviewed Thai restaurants may be presented to the user before the lower reviewed Thai restaurants, etc.).

The various embodiments described herein thus represent a technical improvement to conventional methods for conducting a query search. Using the techniques described herein, an embodiment may receive query input from a user. An embodiment may then determine whether a qualitative modifier (e.g., an adjective, a deictic term, etc.) exists in the query input that modifies a subject of the query input. Responsive to determining that at least one qualitative modifier exists, an embodiment may then identify a user preference associated with the subject of the query input as well as at least one governing criteria that defines the qualitative modifier. Based upon these data points, an embodiment may provide responsive query results to the user. Such a method may refine a user's search query and consequently output more relevant search results.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, query input from a user;
determining, using a processor, whether a qualitative modifier that modifies a subject of the query input;
identifying, responsive to determining that a qualitative modifier exists in the query input and by accessing a user profile, at least one user preference associated with the subject of the query input and at least one governing criteria for the identified qualitative modifier, wherein the at least one user preference corresponds to a ratings threshold and wherein the at least one governing criteria corresponds to a ratings source; and
providing, based on the identifying, query results.

2. The method of claim 1, wherein the qualitative modifier is an adjective.

3. The method of claim 1, wherein the identifying comprises:
accessing a database comprising a plurality of qualitative modifiers; and
determining whether at least one of the plurality of qualitative modifiers is present in the query input.

4. The method of claim 1, wherein the at least one governing criteria is defined by at least one source.

5. The method of claim 4, wherein the at least one source corresponds to at least one of: an individual, a group of individuals, and an entity.

6. The method of claim 4, further comprising prioritizing a definition of the at least one governing criteria from one source over another source.

7. The method of claim 1, wherein the providing comprises filtering out query results that are incompatible with at least one of: the at least one user preference and the modified subject.

8. The method of claim 1, wherein the providing comprises presenting the query results in a list.

9. The method of claim 8, wherein the query results are ranked in the list based upon a determined compatibility with the at least one user preference and the modified subject.

10. The method of claim 9, wherein more compatible query results are presented before less compatible query results.

11. An information handling device, comprising:
a processor;
a memory device that stores instructions executable by the processor to:
receive query input from a user;
determine whether a qualitative modifier exists in the query input that modifies a subject of the query input;
identify, responsive to determining that a qualitative modifier exists in the query input and by accessing a user profile, at least one preference associated with the subject of the query input and at least one governing criteria for the identified qualitative modifier, wherein the at least one user preference corresponds to a ratings threshold and wherein the at least one governing criteria corresponds to a ratings source; and
provide, based on the identifying, query results.

12. The information handling device of claim 11, wherein the qualitative modifier is an adjective.

13. The information handling device of claim 11, wherein the instructions executable by the processor to determine comprise instructions executable by the processor to:
access a database comprising a plurality of qualitative modifiers; and
determine whether at least one of the plurality of qualitative modifiers is present in the query input.

14. The information handling device of claim 11, wherein the at least one governing criteria is defined by at least one source.

15. The information handling device of claim 14, wherein the at least one source corresponds to at least one of: an individual, a group of individuals, and an entity.

16. The information handling device of claim 14, wherein the instructions are further executable by the processor to prioritize a definition of the at least one governing criteria from one source over another source.

17. The information handling device of claim 11, wherein the instructions executable by the processor to provide comprise instructions executable by the processor to filter out query results that are incompatible with at least one of: the at least one user preference and the modified subject.

18. The information handling device of claim 11, wherein the instructions executable by the processor to provide comprise instructions executable by the processor to present the query results in a list.

19. The information handling device of claim 18, wherein the query results are ranked in the list based upon a determined compatibility with the at least one user preference and modified subject.

20. A product, comprising:
a storage device that stores code, the code being executable by a processor and comprising:
code that receives query input from a user;
code that determines whether a qualitative modifier exists in the query input that modifies a subject of the query input;
code that identifies, responsive to determining that a qualitative modifier exists in the query input and by accessing a user profile, at least one user preference associated with the subject of the query input and at least one governing criteria for the identified qualitative modifier, wherein the at least one user preference corresponds to a ratings threshold and wherein the at least one governing criteria corresponds to a ratings source; and
code that provides, based on the identifying, query results.

* * * * *